United States Patent [19]
Harriman

[11] Patent Number: 6,061,783
[45] Date of Patent: *May 9, 2000

[54] METHOD AND APPARATUS FOR MANIPULATION OF BIT FIELDS DIRECTLY IN A MEMORY SOURCE

[75] Inventor: Ward Harriman, Bedford, Mass.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,603

[22] Filed: Nov. 13, 1996

[51] Int. Cl.⁷ .................................................. G06F 9/305
[52] U.S. Cl. ........................... 712/224; 711/155; 712/300
[58] Field of Search .................................... 395/898, 565, 395/564; 712/898, 224, 223, 300; 711/155

[56] References Cited

U.S. PATENT DOCUMENTS

| | | | |
|---|---|---|---|
| 3,906,459 | 9/1975 | Desmonds et al. | 395/565 |
| 3,982,229 | 9/1976 | Rouse et al. | 395/898 |
| 4,103,329 | 7/1978 | Davis et al. | 395/898 |
| 4,467,444 | 8/1984 | Harmon, Jr. et al. | 395/800.42 |
| 4,525,776 | 6/1985 | Eldumiati et al. | 395/562 |
| 4,569,016 | 2/1986 | Hao et al. | 395/565 |

OTHER PUBLICATIONS

*The TTl Data Book,* vol. 2, Texas Instruments, 1985, pp. 3–709 to 3–720.

*Primary Examiner*—Richard L. Ellis
*Attorney, Agent, or Firm*—Blakely, Sokoloff, Taylor & Zafman LLP

[57] ABSTRACT

A method and apparatus allowing for the direct manipulation of bit fields contained in a memory source. Logic circuitry performs a process wherein bit segments and bit fields contained in respective data strings are manipulated or moved along respective data strings, wherein the bit fields may not be aligned in accordance with data bytes contained in a respective data string. Additionally, the logic circuitry may mask any bits not associated with either the bit segment and the bit field in the respective data strings. The logic circuitry performs an arithmetic operation, wherein the masked respective data strings are arithmetically coupled to each other providing a resultant data string, the resultant data string containing the arithmetic result of the bit segment and the bit field segment as a bit field result. The logic circuitry can pass forward masks of the bit field result and any partially modified byte(s) instead of an entire mask of the respective data strings.

41 Claims, 10 Drawing Sheets

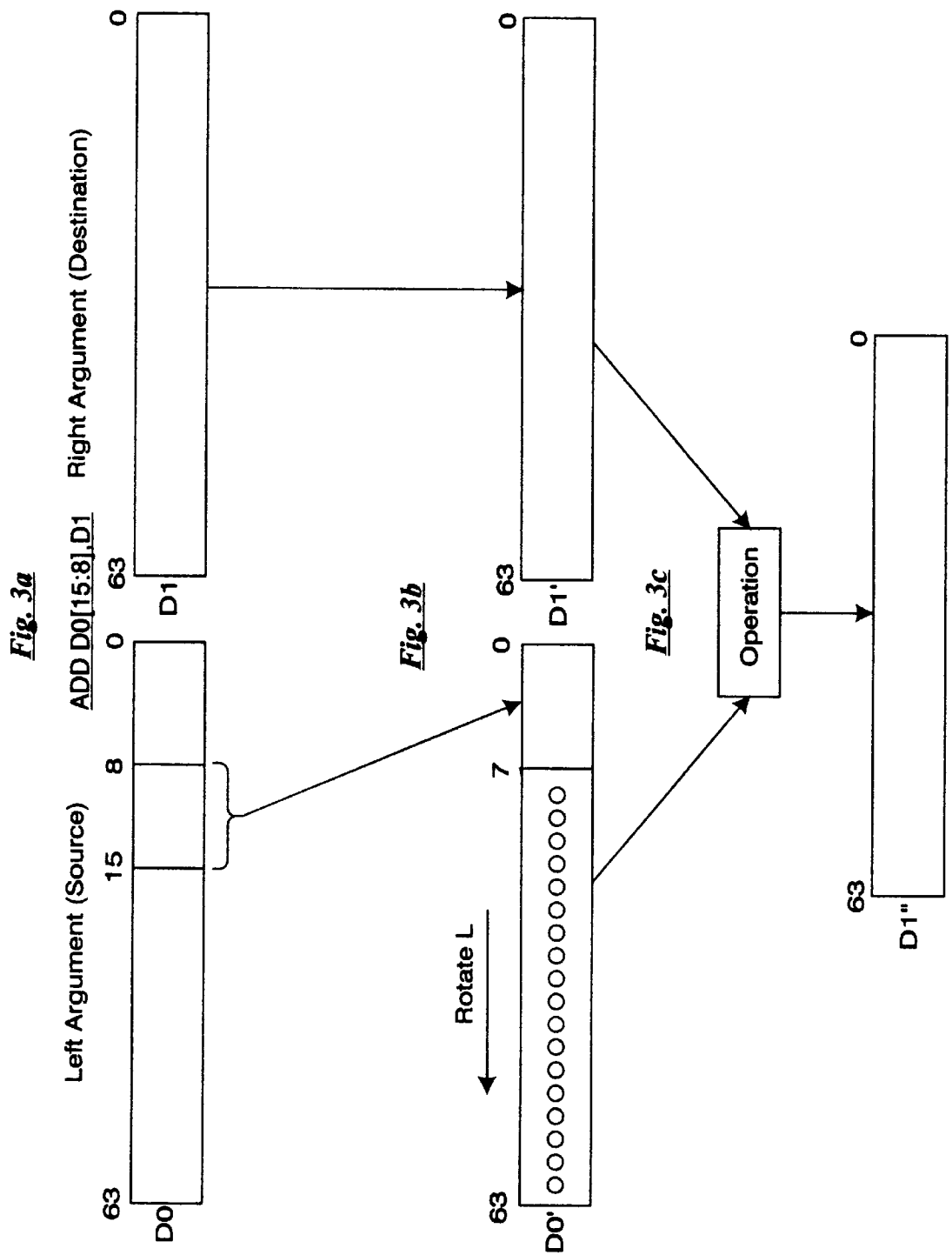

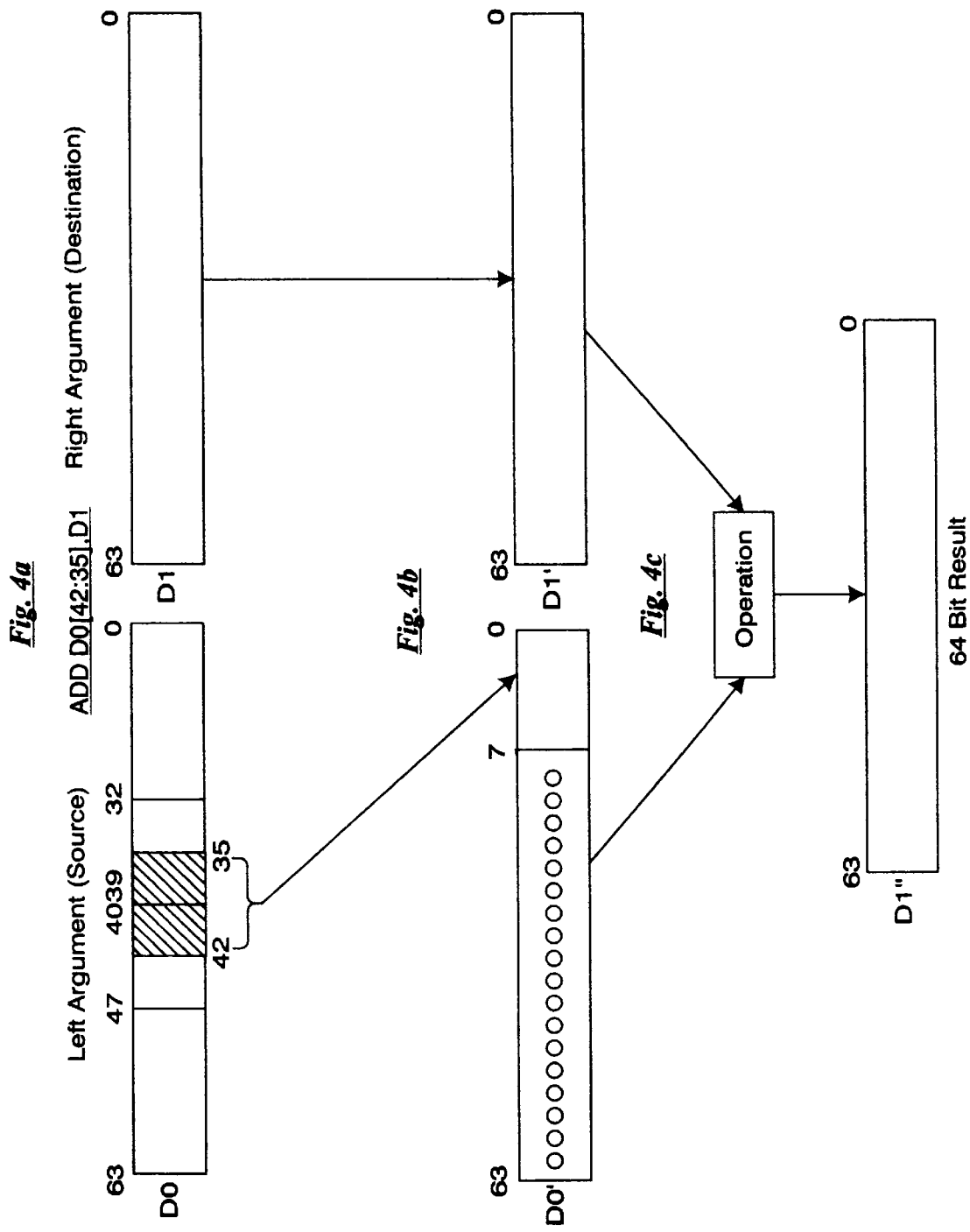

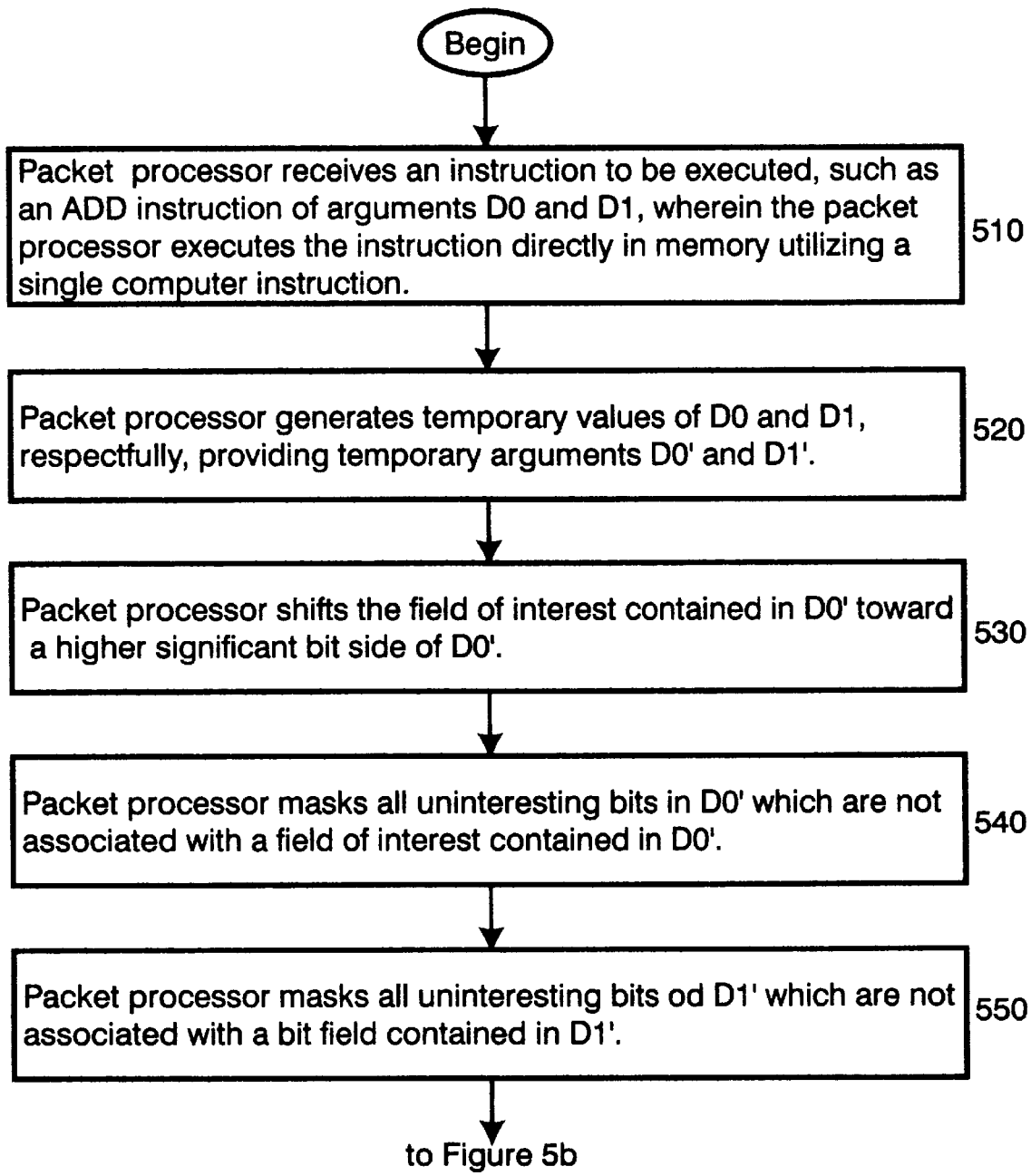

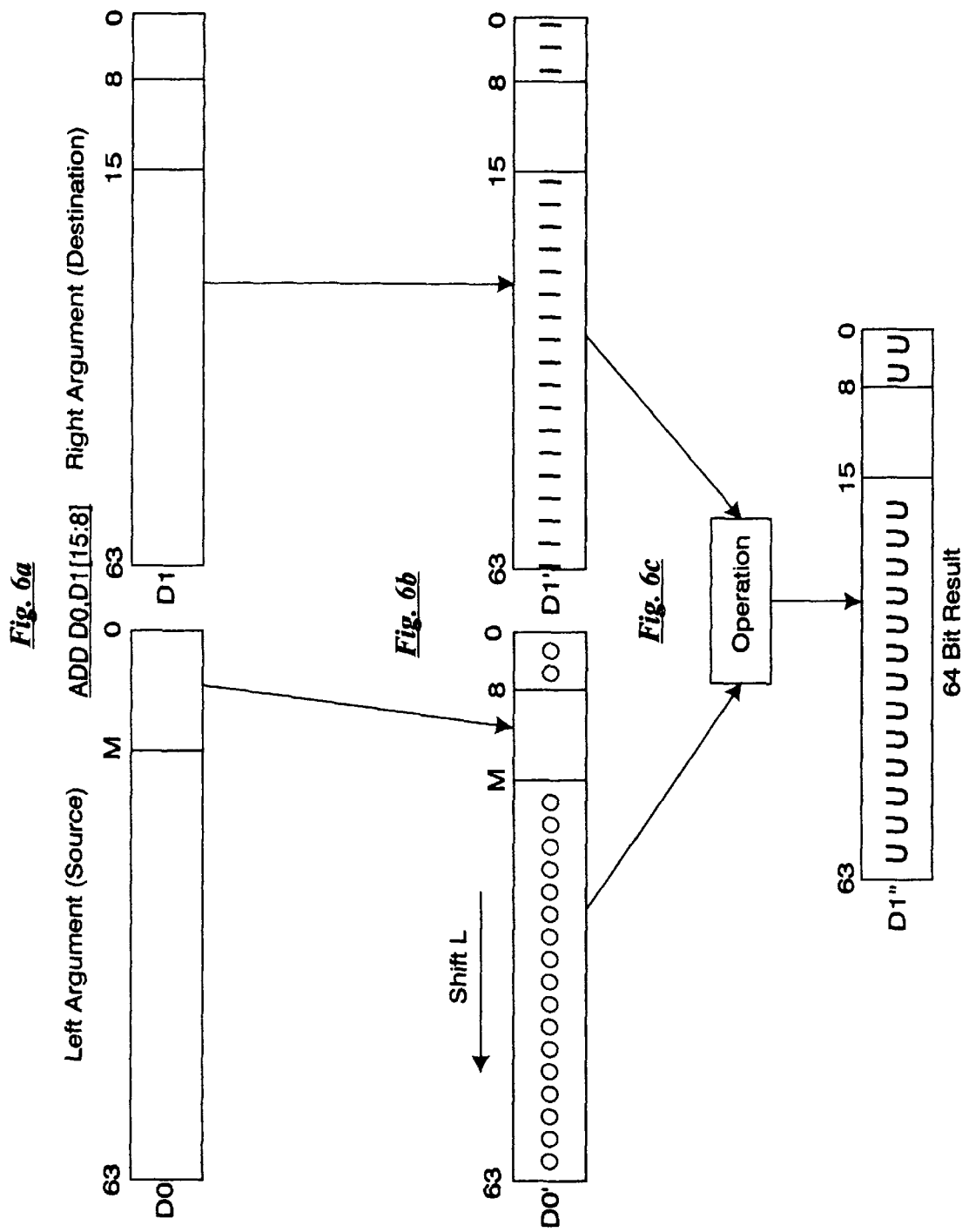

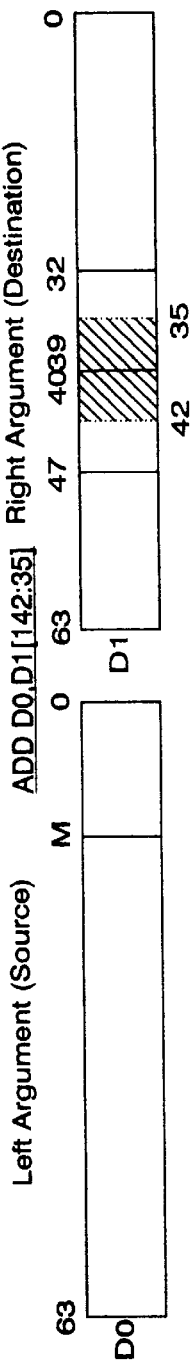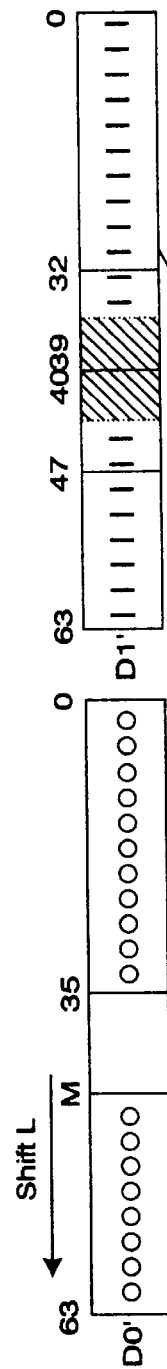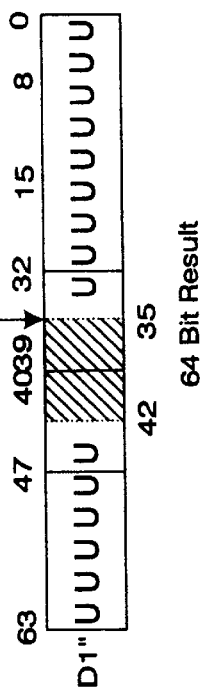
Fig. 7a
Fig. 7b
Fig. 7c

METHOD AND APPARATUS FOR MANIPULATION OF BIT FIELDS DIRECTLY IN A MEMORY SOURCE

BACKGROUND OF THE INVENTION

1. Field of Invention

The present invention relates to the field of computer processors. More specifically, the invention relates to manipulation of bit fields by computer processors.

2. Description of Related Art

In typical computer systems, processors are utilized in order to perform specific operations on data, the data usually consisting of a large number of bits such as 64 bits, using a set of instructions that produce a desired result. For example, the processor may execute a subtraction instruction, wherein a first 64-bit value is subtracted from a second 64 bit value resulting in a third 64 bit value which can be stored to a memory or utilized for further calculations or instructions. However, with the advance in technology and utilization of multimedia applications, such as enhanced graphic displays, image processing, recognition algorithms and video compression/decompression, modern multimedia applications require the manipulation of large amounts of data which may be represented in a small number of bits. Another application which requires similar bit intensive manipulation is packet switching networks. Packet switching networks, similar to multimedia applications, require the manipulation of large amounts of data which may represented in a small number of bits, these amount of data are typically refered to as network data packets. Typically, each of these applications require one or more algorithms, with each algorithm requiring a number of operations to be executed. For example, an algorithm may require numerous operations, such as load, shift, add, and compare, for completion of the algorithm.

Conventional processors provide instructions for separately manipulating each of the elements in these network data packets. For example, an add instruction adds together "corresponding" data elements from a first network data packet and a second network data packet, in order to complete the add instruction. Therefore, if an application requires detailed and expansive algorithms, like packet switching networks, which contain a series of operations which must be performed on a large number of data elements, it is highly desirable to manipulate the network data packets and perform the operations in parallel utilizing the network data packet instruction. By utilizing the representative data contained within the network data packets, and performing the operations in parallel, the processor can process complex applications most efficiently.

A typical application of the advantages of using network data packets is in relation to an operation called check summing. Check summing is an operation for determining the sum of data values contained within a network data packet. Checksum generation is extremely useful, for example in, communications among processors interconnected in a network. In a typical network, a network data packet containing, for example, a binary-encoded bit string of control information and data, may be transmitted from an originating processor to a destination processor, or through one or more intermediate processors. However, during transmission, errors may be introduced into the network data packet by, for example, interference or spurious network noise, resulting in the processing of an erroneous network data packet. The processing of such an erroneous network data packet by the processor may result in the processor rejecting the network data packet, or even causing the processor itself to fail.

To guard against such rejections and failures in relation to network data packets, an error-checking mechanism may be employed in order to verify that the bits contained in the received data is the same as, or correct in comparison, to the transmitted data. The error-checking mechanism allows for erroneous network data packets to be discarded prior to processing, while allowing correct network data packets to pass to the targeted processor. Typically, the checking mechanism comprises generating an arithmetic quantity based upon some, or all, of the bits which are to be transmitted from the originating processor, including the arithmetic quantity in the network data packet when the network data packet is actually transmitted, and then verifying the arithmetic quantity when the network data packet is received by an intermediate or destination processor.

In order to accomplish the traditional generation of checksum values of network data packets, bit fields located within the network data packet's binary-encoded bit string of control information and data must be manipulated in order to obtain the necessary arithmetic quantity. Primarily, checksum generation is accomplished through lane addition, wherein an add instruction adds together "corresponding" or "aligned" data elements or bit fields from a first network data packet and a second network data packet, in order to generate a checksum value which corresponds to a specified transmitted network data packet value.

However, the ability to manipulate such data elements or bit fields in a general purpose computer (GPC) ranges over a wide area, as GPC's are often adapted to the job of packet processing or switching through the introduction of specialized memory subsystems and I/O devices. Some GPC's have no direct support for manipulation of bit fields, but instead rely on "shift", "and", and "or" instructions in order to effect bit field manipulation. While other GPC's provide field insert and extract instructions for general registers, and further, other GPC's provide field insert and extract instructions for memory locations. However, GPC designs all take the same approach to bit field manipulation: isolation of the bit field, manipulation of the bit field, and reintegration of the bit field into a larger convenient data item for processing. Since, the typical GPC requires the individual steps of isolation, manipulation, and reintegration, the GPC processor speed and efficiency is greatly reduced, as the processor must execute each individual operation in order to perform the required steps before the entire instruction is completed.

Moreover, the typical GPC architect has control of both the GPC's processor and compiler and therefore the layout of data structures in memory. This allows the programmer and compiler to 'align' data items conveniently and even change the size of the data item at will. Some GPC architects have gone so far as to only support a single size of data items, thereby requiring the compiler to generate extra instructions when an inconvenient data size is needed for space reasons. Similarly, due to the fact that the extra instructions require certain operations to be executed before processing the packet, the GPC processor speed and efficiency is further reduced.

The format of data for network data packet processing, on the other hand, is not under the control of a designer or compiler writer, rather it is controlled by standards committees. Further, these committees are generally more concerned with minimizing the size of the network data packet, in order to provide fast throughput and increase processing speed, than with ease of processing. Consequently, network data packet formats often include unusual data sizes, such as 3-bit or 5-bit numbers, therefore the packet processor designer must consider the direct manipulation of these unusual data sizes in order to provide a network data packet processor that can quickly and easily manipulate unusual size data items. Since network data packet processing is input/output (I/O) intensive, the goal in network data packet processing is to receive a network data packet from an I/O channel, process (switch) the network data packet, and transmit the network data packet out another channel in minimal time.

SUMMARY OF THE INVENTION

A method and apparatus allowing for the direct manipulation of bit fields contained in a memory source. Logic circuitry performs a first function wherein a bit segment contained in a first data string is moved along the first data string a specified amount corresponding to a bit field contained in a second data string, wherein the bit field may not be aligned with data bytes in the first data string. Alternately, the logic circuitry can perform a second function wherein a bit field contained in a first data string is moved along the first data string a specified amount corresponding to a value contained in the bit field. The logic circuitry, in the first funcction, masks any bits not associated with either the bit segment and the bit field in the respective data strings. While in the second function, the logic circuitry masks bits in the first data string not associated with the bit field. In the first function, the logic circuitry performs an arithmetic operation, wherein the masked respective data strings are arithmetically coupled to each other providing a resultant data string, the resultant data string containing the arithmetic result of the bit segment and the bit field segment as a bit field result, while the remaining data not associated with the bit field result in the resultant bit string remains unchanged from the original bit values contained in the second data string. Alternately, the logic circuitry in the second function arithmetically couples the contents of the bit field contained in the first data string to the entire contents of the second data string providing a resultant data string.

A further operation is executed with the contents of the resultant data string from the first and second operation, wherein the logic circuitry passes on two additional pieces of information to subsequent processing stages associated with the logic circuitry. The logic circuitry creates a 12 bit data segment comprised of a 6 bit most significant bit indicator corresponding to the most significant bit of the bit field result, along with a 6 bit least significant bit indicator corresponding to the least significant bit of the bit field result. Additionally, the logic circuitry creates data segments comprising aligned bytes or an aligned single byte of information which may have been partially modified by the bit field result in the resultant data string. These two pieces of information may be used in constructing a full final argument of a predetermined size, wherein the logic circuitry may merge the two individual bit indicators and any modified byte segments, and update the individual bit values for the respective two pieces of information.

The present invention addresses and overcomes problems associated with general purpose commputer's (GPC) manipulation of bit fields. Specifically, the present invention overcomes the GPC's problem of having to perform multiple operations or process steps in order to manipulate bit field data, which in turn greatly decreases processor speed and efficiency, as the processor must execute each individual instruction in order to perform the required steps before the entire instruction is completed. Moreover, and more importantly, the present invention allows for the manipulation of unusually sizes data which may not be "aligned". The present invention provides for the "direct" manipulation of bit fields in memory, without the standard and inefficient steps of isolating and reintergrating the bit fields in order to generate a result, which results in a faster network data packet processing time and efficient usage of processor utilities.

BRIEF DESCRIPTION OF THE DRAWINGS

FIGS. 3a, 3b, and 3c illustrates, in a physical representation, a field to simple bit field manipulation operation utilizing an aligned bit field.

FIGS. 4a, 4b, and 4c illustrates, in a physical representation, a field to simple bit field manipulation operation utilizing an unaligned bit field.

FIGS. 5a and 5b illustrates, in a flowchart format, a simple to field bit field manipulation operation.

FIGS. 6a, 6b, and 6c illustrates, in a physical representation, a simple to field bit field manipulation operation utilizing an aligned bit field.

FIGS. 7a, 7b, and 7c illustrates, in a physical representation, a simple to field bit field manipulation operation utilizing an unaligned bit field.

DETAILED DESCRIPTION

In the following description, numerous specific details are set forth to provide a thorough understanding of the invention, for example, the teachings of the present invention are illustrated in the context of a processor for use with a network device. However, it is to be understood that the invention may be practiced without these specific details, as the present disclosure is to be considered an exemplification of the principles of the invention, and is not intended to limit the invention to that as illustrated and described herein.

The present invention is directed to a novel method and apparatus providing for the direct manipulation of a specified aligned and unaligned bit fields contained within a bit string.

A Packet Processing Computer Architecture

Figure 1:
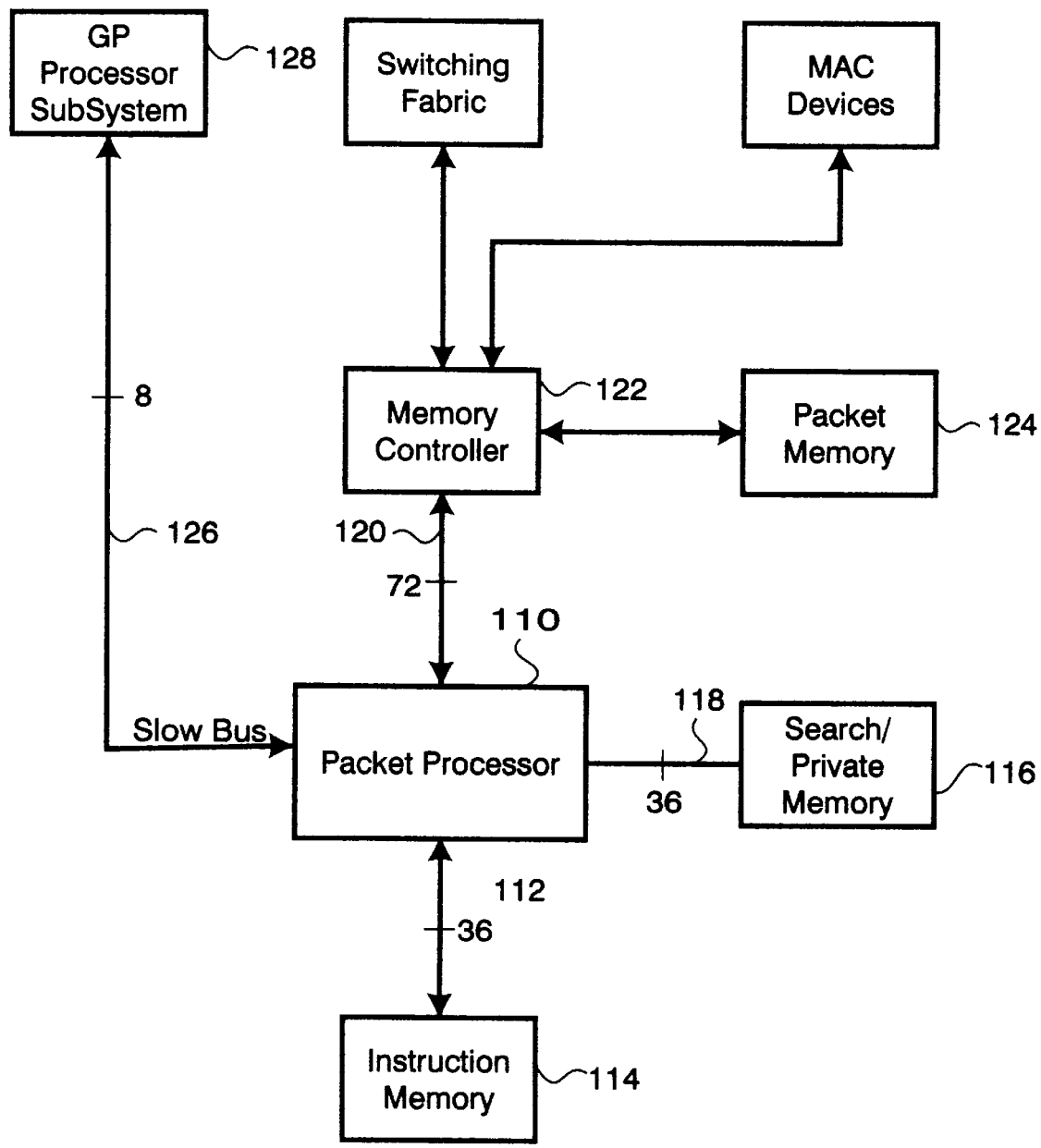
FIG. 1 illustrates a processing unit in accordance with the concepts of the present invention.

FIG. 1 illustrates an exemplary system utilizing a dedicated packet processor 110 constructed in accordance with the teachings of the present invention, along with associated system components, wherein the packet processor 110 provides for direct manipulation a specified bit field contained within a bit string. The packet processor 110 is an application specific processor, its instruction set has built in expectations about how specific memories are utilized. The packet processor 110 may typically utilize three major buses and a maintenance bus, in accessing and utilizing associated memories. An instruction memory bus 112, which is coupled to the packet processor 110, is a 32-bit bus which runs at the packet processor's frequency. The packet processor 110 has no instruction cache, and as a result, expects to fetch an instruction from an instruction memory 114 through the instruction memory bus 112 every cycle. The instruction memory 114 can be loaded with instructions via a slow-bus interface or ST64 instructions to the instruction region. It is also possible to use an LD64 instruction to access instruction space. The slow bus interface provides a 16-bit address bus for possible 64K instructions.

The packet processor 110 also incorporates a table lookup instruction, this instruction works on tables stored in a Search memory portion of a Search/Private memory 116 accessed through a search/private memory bus 118. The search/private memory bus 118, which couples the packet processor 110 with the Search/Private memory 116, is a 36-bit bus which runs at the packet processor's frequency. The packet processor 110 expects to have access to a very fast, sizable memory for storing local or private data, including statistic counters or other instructions which may only operate on a Private memory. It is also possible to Load and Store to the Private memory. Private memory and Search memory are in the same physical block of memory, the Search/Private memory 116, which enables the programmer to determine the allocation of memory to specific purposes.

A packet memory bus 120, which is a 72-bit bus, is connected between the packet processor 110 and a memory controller 122 which allows access to a packet memory 124. Additionally, it is expected that the packet memory 124, which contains packets to be routed, is a sizable memory which allows for data contained within this memory to be cached, while data from other memories cannot be cached.

A slow-bus 126, which is a 8-bit bus operating at a somewhat asynchronous speed, is coupled between a general purpose (GP) processor sub-system 128 and the packet processor 110, and is utilized by the packet processor 110 for loading instruction ram and other maintenance operations. Additionally, other components such as, for example, Media Access Controller (MAC) devices and Fabric may be coupled to the memory controller 122 to provide access to additional resources.

Direct Memory Manipulation and Bit Field Manipulation

Memory is an important feature of the packet processor 110. An access to memory is just as fast and just as flexible as an access to a data register for the packet processor 110. Further, all arithmetic operations which can be performed on data registers can also be performed on memory. Because memory can be manipulated just as readily as data registers, the packet processor programmer need not worry about loads, stores, misalignments, or register optimizations. Further, because the packet processor 110 provides generic field manipulation, the programmer can generally manipulate the data "in place" (memory) rather than having to first isolate it in some general register. This has a significant effect on the number of instructions which must be executed.

As memory can be manipulated directly, there is no need for Load and Store instructions for most processing. From a programmer's perspective, accessing any memory location is no slower than accessing a general purpose register through the usage of a sophisticated cacheing system and by encoding the Memory (M) operands within the instruction rather than using instruction extensions. The packet processor 110 can encode the Memory (M) operand within the instruction because the reasonable offsets from an A register are quite small. This is unlike a typical general purpose (GP) application where data structures must be allowed to be quite large. In packet processing the packet data structure is generally on the order of 10 to 50 bytes. Since Memory is 64 bits wide, it is rarely the case that the offset of a Memory (M) operand from the A register is more than 8 words or 3 bits. Essentially, each address register A effectively maps 8 memory locations onto a flat register space. Therefore, if a programmer writes "D0" then the general register D0 is being used, and if the programmer writes "A[0]" then the first word in memory starting at A[0] is being used. Both of these encodings are equally 'fast' and can be easily manipulated.

However, the ability to manipulate such data elements or bit fields in a general purpose computer (GPC) ranges over a wide area, as GPC's are often adapted to the job of packet processing or switching through the introduction of specialized memory subsystems and I/O devices. Some GPC's have no direct support for manipulation of bit fields, but instead rely on "shift", "and", and "or" instructions in order to effect bit field manipulation. While other GPC's provide field insert and extract instructions for general registers, and further, other GPC's provide field insert and extract instructions for memory locations. However, GPC designs all take the same approach to bit field manipulation: isolation of the bit field, manipulation of the bit field, and reintegration of the bit field into a larger convenient data item for processing.

The ability to manipulate bit fields or data elements directly in memory, is most importantly, unique to the CXP processing unit 110. The packet processor 110 utilizes the packet processor's underlying hardware rather than relying on and executing typical instructions associated with GPC's, as described above, in order to perform the isolation and re-integration steps. Utilizing the packet processor's underlying hardware increases the depth of the pipeline in the packet processor 110, without any detrimental effect on the packet processor 110 throughput. The packet processor 110 contains an argument fetch unit, however, the argument fetch unit does not 'extract' the specified field to a known place (i.e.—register) before passing the information to another stage such as, for example, an adder. Each packet processor instruction, with few exceptions, allows for the direction manipulation of bit fields directly in memory. No separate insert or extract instructions are necessary, as the underlying hardware takes care of it automatically.

The packet processor 110, with its ability to directly manipulate bit fields directly in memory has two major benefits. First, the programmer has a much easier time in writing the code which manipulates the packet data. This aspect is particularly important as packet processing applications are almost always written in assembly code. Second, the amount of code needed to manipulate these unique data sizes or bit fields is greatly reduced. The following example illustrates the utility of the above benefits. Consider the need to increment a 5 bit field contained in bits 9:4 of a word in memory. Further, assume no other information within the word which holds the field will be read or written and that the memory is pointed to by an arbitrary register. For the simple typical RISC engine, the instruction sequence would be:

```
load      (pointer),D0;      load the data word.
shft_rt   D0,4,D1;           shift the data over and put in D1.
```

```
-continued add      1,D1,D1;       add the 1 (increment it).
and      0x1F,D1,D1;    mask of any unused bits.
shft_lf  D1,4,D1;       shift it back to orignal position.
and      ~0x1F0,D0,D0;  make room for it.
or       D1,D0,D0;      merge the data back.
ST       D0,(pointer);  store it back.
```

Some RISC engines provide "insert" and "extract" instructions which simplfy the above instruction sequence. The following is one possible system wherein the insert and extract instructions have reduced the code down to only five instructions:

load (pointer),D0;

extract D0[9:4],D1;

add 1,D1,D1;

insert D1,D0[9:4];

ST D0,(pointer).

The packet processor 110 of the present invention , however, implements the above need to increment a 5 bit field contained in bits 9:4 of a word in memory through the direct manipulation of the bit field using:

add 1,A0[0][9:4].

As illustrated above, the RISC engine requires between 5 and 8 instructions, whereas the packet processor 110 of the present invention only requires a single instruction to accomplish the same task. Thus, not only is the overall size of the program greatly reduced, but just an importantly, the number of instructions written by the programmer is also reduced. These factors translate into increased efficiency and productivity on behalf of the programmer as decreased and simpler instructions will tend to have fewer 'bugs' in the code. Further, the programmer will produce closer to optimal code because the programmer does not have to figure out the 'most efficient way' to perform various tasks. In most cases, the programmer will naturally manipulate packet data or bit fields in the most efficient manner simply because the instruction set provides for such.

Another beneficial characteristic of the packet processor instruction set is that the number of different instructions is quite small. As a result, the programmer (and compiler) need not understand the intricate details of a large number of different instructions in order to produce good code. Thus, the programmer is freed from such considerations as register allocation for transient data (when to keep packet data in registers and when to write it back out) and efficient field manipulation (how to best insert or extract a field and to best manipulate the field data directly).

There are essentially two styles or types of bit field manipulation, simple to field and field to simple. Simple to field operations occur when the bit field is on a destination argument which is aritmetically coupled to a source argument, while the field to simple operations occur when the bit field is on a source argument which is coupled to a destination argument.

FIGS. 2–6 illustrate the actual bit field manipulation performed by the packet processor 110 on 64 bit words, as the packet processor 110 performs the steps of actually 'isolating (extracting), manipulating, and reintergrating (inserting)' the specified bit field, indicated by a [#:#] symbol, in memory without the need to use separate insert and extract instructions. Although the following examples illustrate add operations being performed on data strings of 64 bits in size, alternative embodiments may be utilized in which a variety of different arithmetic operations may be performed on a variety of different bit sized data strings. Additionally, the disclosed examples of bit field manipulation may further be utilized and applied to various other computer related operations wherein such bit field manipulation may be required.

Field to Simple Bit Field Manipulation Method

Figure 2:
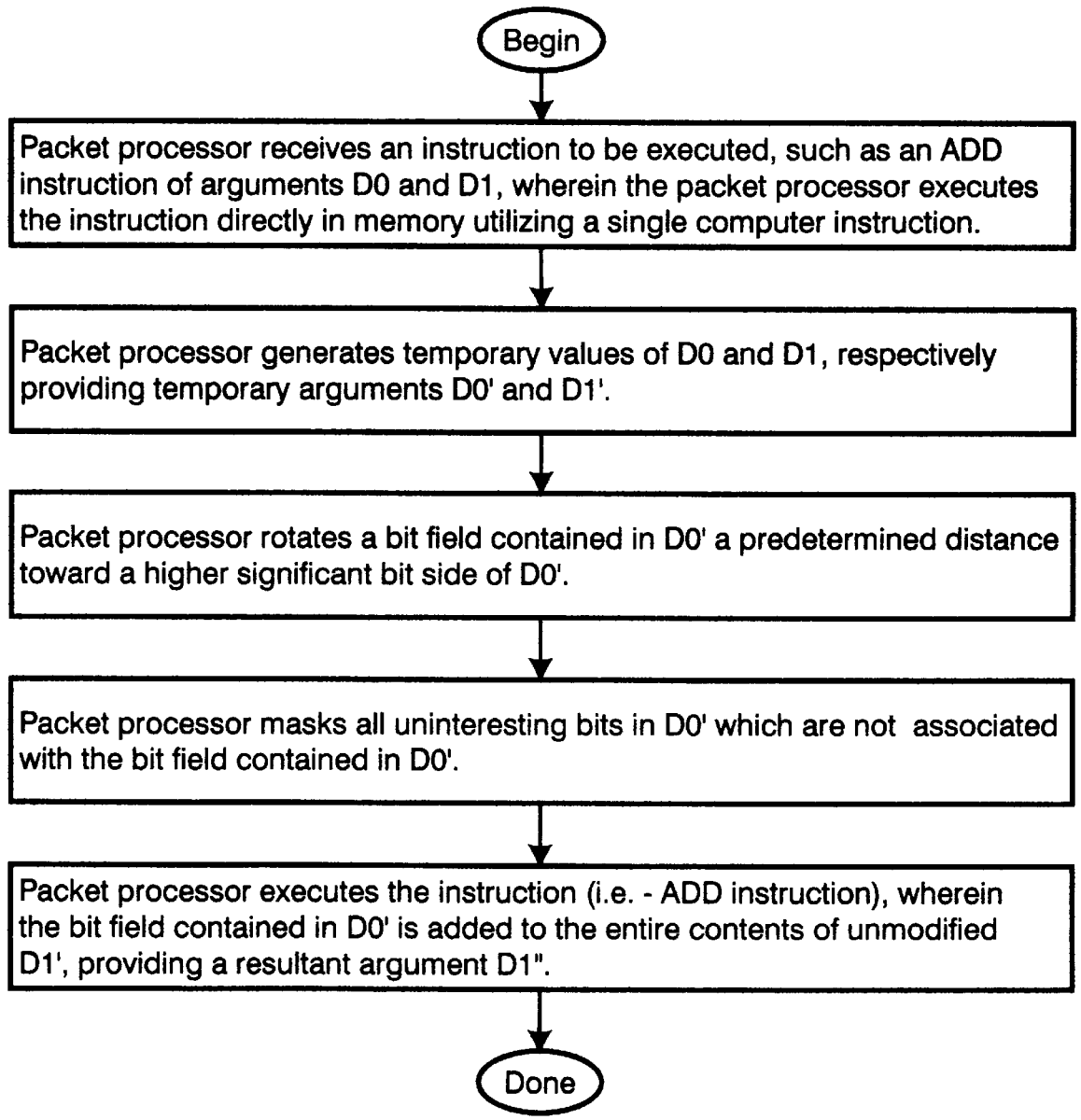
FIG. 2 illustrates, in a flowchart format, a field to simple bit field manipulation operation.

FIG. 2 illustrates, in a flowchart, the method utilized in Field to Simple Bit Field Manipulation operations. The method essentially is comprised of receiving an instruction to be executed, for example an ADD instruction, wherein a bit field contained in a first argument D0 is added to the contents of a second argument D1, and the packet processor 110 executes the instruction directly in memory utilizing a single computer instruction.

First, temporary values of D0 and D1 are generated, providing temporary arguments D0' and D1', respectively. The bit field contained in D0' is then rotated a predeterminded distance toward a higher significant bit side of D0', the predetermined distance specified by a most significant bit of D0' minus an amount specified by a least significant bit contained in the bit field.

Next, all uninteresting bits in D0' which are not associated with the bit field contained in D0' are masked and set to a logic state of zero.

Finally, execution of the instruction (i.e.—ADD instruction) is commenced, wherein the bit field contained in D0' is added to the entire contents of unmodified D1', providing a resultant argument D1".

Field to Simple Bit Field
Manipulation—Example 1

FIG. 3 illustrates a physical representation of the sequence performed on data in field to simple operations, wherein the bit field is aligned and is located on the source argument D0 (left argument). Initially, an instruction is received by the packet processor 110 as to the desired operation that is to be performed with a source argument D0 (left argument) and a destination argument D1 (right argument), for example, "ADD D0[15:8], D1", as illustrated in FIG. 3a. In this instruction, ADD D0[15:8], D1, the bit field is aligned in an individual byte (8 bits) contained between bits 15 and 8 of the source argument DO. As illustrated by the instruction ADD D0[15:8], D1, there are no other required instructions necessary for adding the aligned bit field contained in the source argument D0 to the contents contained in the destination argument D1, rather the packet processor 110 is able to directly manipulate the data in place (memory) without the need to isolate (extract) and reintergrate (insert) the bit field.

FIG. 3b illustrates the operation wherein the packet processor 110 generates a modified temporary value of the preceding arguments which will be used in processing the above ADD instruction. The packet processor 110 creates a temporary source argument D0', from the initial source argument D0 contained in FIG. 3a, in order to carry out the requested instruction. The CXP processing unit rotates the source argument D0 toward the left, or toward the higher significant bit side, by an amount of 64 (indicating the highest significant bit of the argument's size) minus an amount specified by the least significant bit contained in the bit field (8 bits).

The resulting temporary source argument D0', in FIG. 3b, is then masked by the packet processor 110, so that all uninteresting bits not associated with the bit field are set to zero (0). Additionally, as indicated in FIG. 3b, the packet processor 110 generates a temporary destination argument D1', which remains unchanged from the initial destination argument D1, for use in the ADD instruction.

Subsequently, the arithmetic operation is performed, in this example an ADD operation, as depicted in FIG. 3c, in which the operation adds the bit field contained in the temporary source argument D0' to the entire contents of the temporary destination argument D1', cutting off any overflow, to form a full 64 bit word D1".

Field to Simple Bit Field Manipulation—Example 2

FIG. 4 illustrates the sequence performed on data in field to simple operations, wherein the bit field is unaligned and is located on the source argument D0 (left argument). Initially, an instruction is received by the packet processor 110 as to the desired operation that is to be performed with the source argument D0 (left argument) and the destination argument D1 (right argument), for example, "ADD D0[42:35], D1", as illustrated in FIG. 4a. In this instruction, ADD D0[42:35], D1, the bit field is unaligned and overlaps into two adjacent aligned bytes, as illustrated in FIG. 4a, with a first or upper byte being contained in aligned byte {47-40}, and a second or lower byte being contained {39-32}. As illustrated by the instruction ADD D0[42:35], D1, there are no other required instructions necessary for adding the unaligned bit filed contained in the source argument D0 to the contents contained in the destination argument D1, rather the packet processor 110 is able to directly manipulate the data in place without the need to isolate (extract) and reintergrate (insert) the bit field.

FIG. 4b illustrates the operation wherein the packet processor 110 generates a modified temporary value of the preceding arguments which will be used in processing the above ADD instruction. The packet processor 110 creates a temporary source argument D0', from the initial source argument D0 contained in FIG. 4a, in order to carry out the requested instruction. The packet processor 110 rotates the source argument D0 toward the left, or toward the higher significant bit side, by an amount of 64 (indicating the highest significant bit of the argument's size) minus an amount specified by the least significant bit contained in the bit field (35 bits).

The resulting temporary source argument D0' in FIG. 4b is then masked, so that all uninteresting bits not associated with the bit field are set to zero (0). Additionally, as indicated in FIG. 4b, the CXP processing unit 10 generates a temporary destination argument D1', which remains unchanged from the initial destination argument D1, for use in the ADD instruction.

Subsequently, the arithmetic operation is performed, in this example an ADD operation, as depicted in FIG. 4c, in which the operation adds the bit field contained in the temporary source argument D0' to the entire contents of the temporary destination argument D1', cutting off any overflow, to form a full 64 bit word D1".

Simple to Field Bit Field Manipulation Method

Figure 5B:
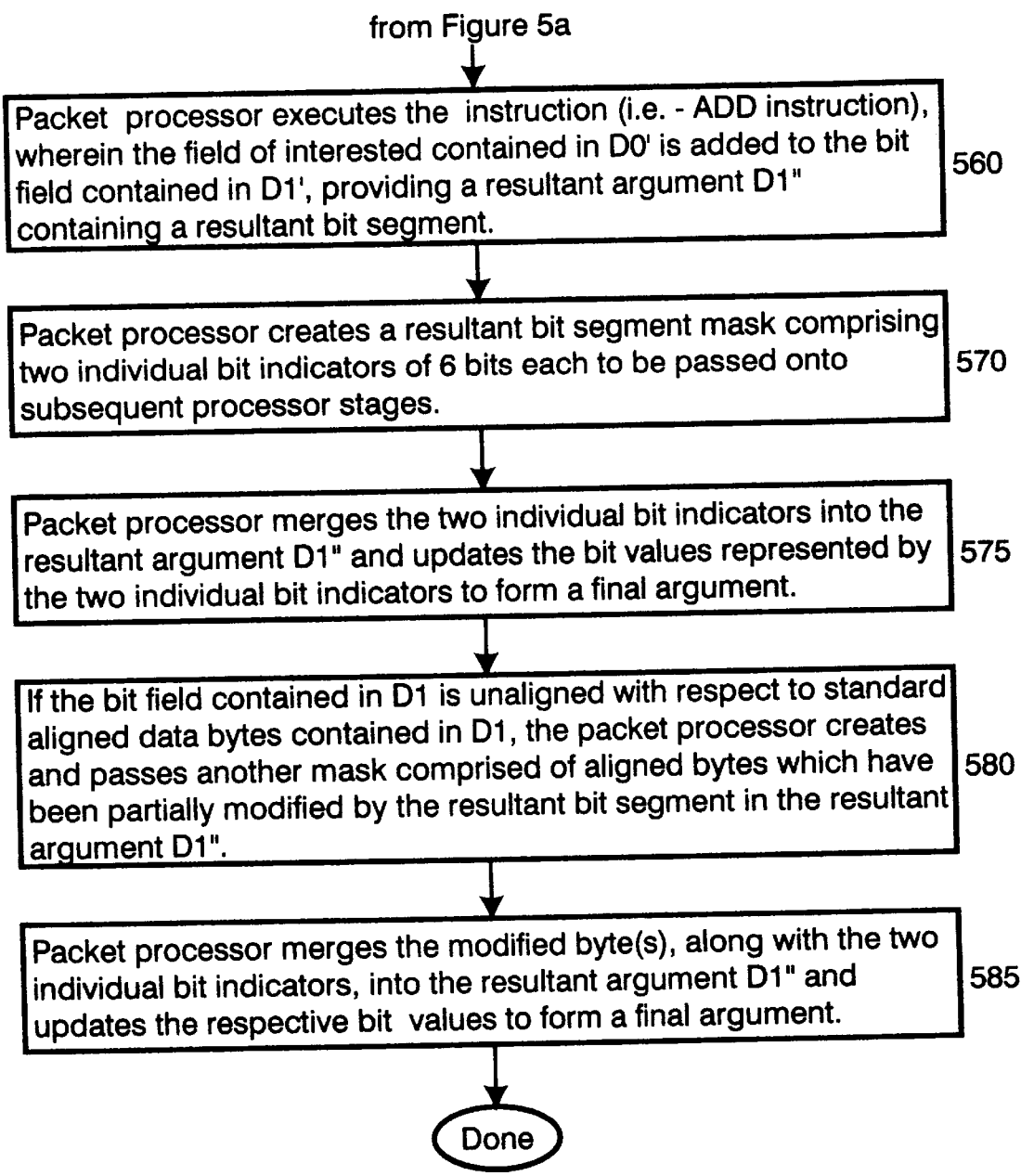

FIG. 5 illustrates, in a flowchart, the method utilized in Simple to Field Bit Field Manipulation operations. The method essentially is comprised of receiving an instruction to be executed, for example an ADD instruction, wherein a field of interest contained in a first argument D0 is added to a bit field contained in a second argument D1, and the packet processor 110 executes the instruction directly in memory utilizing a single computer instruction.

First, temporary values of D0 and D1 are generated, providing temporary arguments D0' and D1', respectively. The field of interest contained in D0' is shifted a predetermined distance toward a higher significant bit side of D0', the predetermined distance specified by a least significant bit contained in the bit field.

Next, all uninteresting bits in D0' which are not associated with the field of interest contained in D0' are masked and set to a logic state of zero.

Additionally, all uninteresting bits in D1' which are not associated with the bit field contained in D1' are masked and set to a logic state of either 1's or 0's, or a combination of both 1's and 0's, depending on the operation taking place.

Subsequently, execution of the instruction (i.e.—ADD instruction) is commenced, wherein the field of interest contained in D0' is added to the bit field contained in D1', providing a resultant argument D1" containing a resultant bit segment. The resultant bit segment comprising the arithmetic result of the arithmetic operation of the field of interest contained in D0' with the bit field contained in D1'.

After execution, a resultant bit segment mask comprising two individual bit indicators of 6 bits each is created and passed onto subsequent processor stages; the two individual bit indicators comprising a least significant bit indicator corresponding to a least significant bit of the resultant bit segment and a most significant bit indicator corresponding to a most significant bit of the resultant bit segment.

Next, the two individual bit indicators are merged into the resultant argument D1" and the bit values represented by the two individual bit indicators are updated to form a final argument, wherein the bits not associated with the resultant bit segment represented by the individual bit indicators remain unchanged from the original D1 or D1' bit values.

If the bit field contained in D1 is unaligned with respect to standard aligned data bytes contained in D1, another mask comprised of aligned bytes which have been partially modified by the resultant bit segment in the resultant argument D1" is created and passed onto subsequent processor stages.

The modified byte(s), along with the two individual bit indicators are merged into the resultant argument D1" and the respective bit values of each updated to form form a final argument, wherein the bits not associated with either the resultant bit segment represented by the individual bit indicators or the modified byte(s), remain unchanged from the original D1 or D1 bit values.

Simple to Field Bit Field Manipulation—Example 1

FIG. 6 illustrates the sequence performed on data in simple to field operations, wherein the bit field is aligned and is located on the destination argument D1. Initially, an instruction is received by the packet processor 110 as to the desired operation that is to be performed with the source argument D0 (left argument) and the destination argument D1 (right argument), for example, "ADD D0, D1[15:8]", as illustrated in FIG. 6a. Similar to the aforementioned operations, as illustrated by the instruction ADD D0, D1[15:8], there are no other required instructions necessary for adding the contents contained in the source argument D0 to the bit field contained in the destination argument D1, rather the packet processor 110 is able to directly manipulate the data in place (memory) without the need to isolate (extract) and reintergrate (insert) the bit field.

FIG. 6b illustrates the operation wherein the packet processor 110 generates a modified temporary value of the preceding arguments which will be used in processing the above ADD instruction. The packet processor 110 creates a temporary source argument D0', from the initial source argument D0 contained in FIG. 6a, in order to carry out the requested instruction. The packet processor 110 shifts the source argument D0 toward the left, or toward the higher significant bit side, by an amount specified by the least significant bit contained in the bit field (8 bits), in order to align the least significant bit of D0 with the least significant bit of the bit field contained in the destination argument D1.

The resulting temporary source argument D0', in FIG. 6b, is then masked so that all uninteresting bits in the temporary source argument D0' are set to zero (0).

Additionally, as indicated in FIG. 6b, the packet processor 110 generates a temporary destination argument D1', which is changed from the initial destination argument D1, for use in the ADD instruction. The packet processor 110 masks off bits not associated with the bit field located in the initial destination argument D1, pads the masked off bits with either 1's or 0's, or a combination of both 1's and 0's, depending on the operation taking place, to form a temporary destination argument D1' comprising a full 64-bit argument. If, for example, an ADD operation is taking place, the masked bits which are located at an upper or higher significant bit area then the bit field are filled with 1's, while the masked bits which are located at a lower or least significant bit area are filled with either 1's or 0's, so any carry out will be correctly propagated out of D1'. Alternately, if a SUBTRACT operation is taking place, a carry in is needed to be propagated into the field, as dictated by typical complement, increment, and add requirements of a SUBTRACT operation. Therefore, the masked bits which are located at an upper or higher significant bit area then the bit field are filled with 1's, so any carry out will be correctly propagated out of D1', while the masked bits which are located at a lower or least significant bit area are filled with 1's, so that any carry in is correctly propagated into the field.

Subsequently, the arithmetic operation is performed, in this example an ADD operation, as depicted in FIG. 6c, in which the operation adds the contents contained in the temporary source argument D0' to the bit field contained in the temporary destination argument D1', to form a full 64 bit word D1" containing a resultant bit segment. The resultant bit segment comprising the arithmetic result of the arithmetic operation of the field of interest contained in D0' with the bit field contained in D1'. The ADD operation, as depicted in FIG. 6c, only modifies or updates the bit field [15:8] of the temporary destination argument D1', with the remaining bits of data not associated with the bit field remaining unchanged, to form a full 64 bit word D1".

Simple to Field Bit Field Manipulation—Example 2

FIG. 7 illustrates the sequence performed on data in simple to field operations, wherein the bit field is unaligned and is located on the destination argument D1. Initially, an instruction is received by the packet processor 110 as to the desired operation that is to be performed with the source argument D0 (left argument) and the destination argument D1 (right argument), for example, "ADD D0, D1[42:35]", as illustrated in FIG. 7a. In this instruction, ADD D0, D1[42:35], the bit field is unaligned and overlaps into two adjacent aligned bytes, as illustrated in FIG. 7b, the first or upper byte being contained in aligned byte {47-40}, and the second or lower byte being contained in aligned byte {39-32}. Similar to the aforementioned operations, as illustrated by the instruction ADD D0, D1[42:35], there are no other required instructions necessary for adding the contents contained in the source argument D0 to the bit field contained in the destination argument D1, rather the packet processor 110 is able to directly manipulate the data in place (memory) without the need to isolate (extract) and reintergrate (insert) the bit field.

FIG. 7b illustrates the operation wherein the packet processor 110 generates a modified temporary value of the preceding arguments which will be used in processing the above ADD instruction. The packet processor 110 creates a temporary source argument D0', from the initial source argument D0 contained in FIG. 7a, in order to carry out the requested instruction. The CXP processing unit shifts the source argument D0 toward the left, or toward the higher significant bit side, by an amount specified by the least significant bit contained in the bit field (35 bits), in order to align the least significant bit of D0 with the least significant bit of the bit field contained in the destination argument D1.

The resulting temporary source argument D0', in FIG. 7b, is then masked so that all uninteresting bits in the temporary source argument D0' are set to zero (0). Additionally, as indicated in FIG. 7b, the packet processor 110 generates a temporary destination argument D1', which is changed from the initial destination argument D1, for use in the ADD instruction. The packet processor 110 masks off bits not associated with the bit field located in the initial destination argument D1, pads the masked off bits with either 1's or 0's, or a combination of both 1's and 0's, depending on the operation taking place, to form a temporary destination argument D1' comprising a full 64 bit argument. If, for example, an ADD operation is taking place, the masked bits which are located at an upper or higher significant bit area then the bit field are filled with 1's, while the masked bits which are located at a lower or least significant bit area are filled with either 1's or 0's, so any carry out will be correctly propagated out of D1'. Alternately, if a SUBTRACT operation is taking place, a carry in is needed to be propagated into the field, as dictated by typical complement, increment, and add requirements of a SUBTRACT operation. Therefore, the masked bits which are located at an upper or higher significant bit area then the bit field are filled with 1's, so any carry out will be correctly propagated out of D1', while the masked bits which are located at a lower or least significant bit area are filled with 1's, so that any carry in is correctly propagated into the field.

Subsequently, the arithmetic operation is performed, in this example an ADD operation, as depicted in FIG. 7c, in which the operation adds the contents contained in the temporary source argument D0' to the bit field contained in the temporary destination argument D1', to form a full 64 bit word D1" containing a resultant bit segment. The resultant bit segment comprising the arithmetic result of the arithmetic operation of the field of interest contained in D0' with the bit field contained in D1'. The ADD operation, as depicted in FIG. 7c, only modifies or updates the bit field [42:35]of the temporary destination argument D1', with the remaining bits of data remaining unchanged, to form a full 64 bit word D1".

Merging Results with Memory

FIGS. 8 and 9 illustrates a merge operation which is performed with the full 64 bit word D1" in Simple to Field Bit Field Manipulation operations. The packet processor's argument fetch unit passes on through the processor pipeline not just the argument D1", but additionally either one or two additional pieces of information depending upon the position of the resultant bit segment contained in the argument D1".

The packet processor's argument fetch unit passes a first piece of information comprising a bit indicator mask of which particular bits should be updated, and if necessary, a second piece of information comprising a modified byte(s) mask having selected bits which should not be updated. The second piece of information, if needed, would not be necessary if the register file had a 'write per bit' back to ram, however, 'write per bit' is expensive in VLSI RAMs. Therefore, the packet processor 110 typically utilizes standard memory devices for storing register values, such as a standard multi-port RAM module with the ability to write individual bytes, nevertheless, a more expensive standard multi-port RAM having the ability to write individual bits may be utilized as well.

Figure 8A:
FIGS. 8a and 8b illustrates, in a physical representation, a merge operation utilized in conjunction with a simple to field bit field manipulation operation utilizing an aligned bit field.
Figure 8B:
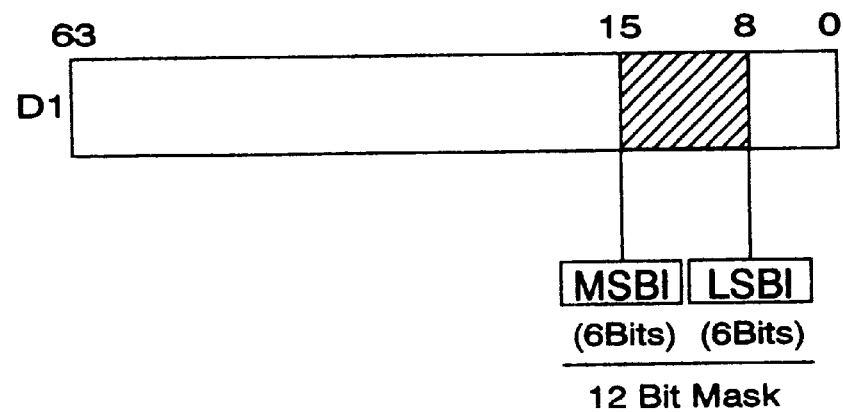

FIG. 8 illustrates the merge operation corresponding to the argument D1" of FIG. 6c. As illustrated, in FIG. 8a, the resultant bit segment is aligned with a standard byte segment in the argument D1" relating to FIG. 6c, wherein the bit field was also originally aligned with a standard byte segment in D1. Initially, after the arithmetic operation is performed, a bit field indicator mask corresponding to the resultant bit segment from the full 64 bit word D1" is formed. The bit field indicator mask itself is comprised of two significant bit indicators, a least significant bit indicator comprised of 6 bits corresponding to the least significant bit of the bit field, and a most significant bit indicator comprised of 6 bits corresponding to the most significant bit of the bit field, creating a bit field indicator mask of 12 bits total, as illustrated in FIG. 8b.

The packet processor's argument fetch unit does not convey 64 bits of 'mask' as would be natural in typical systems, rather, the packet processor's argument fetch unit passes on, to subsequent processor stages, only the two significant bit indicators corresponding to the resultant bit segment (12 bits total), which in turn reduces the amount of pipeline registers needed.

When a final merge operation takes place, the bit field indicator mask (12 bits) corresponding to the resultant bit segment, which reduces the number of bits carried in subsequent pipeline stages, is used to reconstruct a 64 bit merge mask, rather than carrying forward two typical 64 bit masks normally associated with typical applications of bit field manipulation. Further, the packet processor 110 updates the bit values of the resultant bit segment from the two individual bit indicators into a resultant argument for use by the packet processor 110. Any of the modified bit values contained in the resultant argument of the final merge step are written back to register file.

Figure 9A:
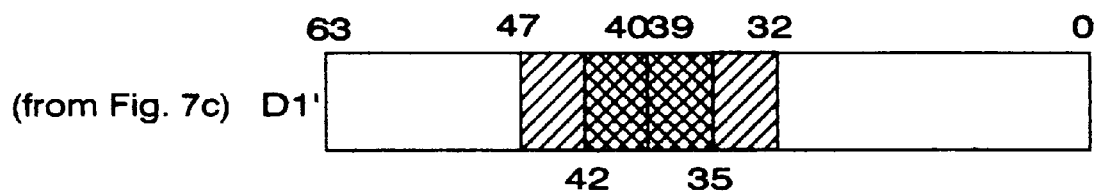
FIGS. 9a, 9b, and 9c illustrates, in a physical representation, a merge operation utilized in conjunction with a simple to field bit field manipulation operation utilizing an unaligned bit field.
Figure 9B:
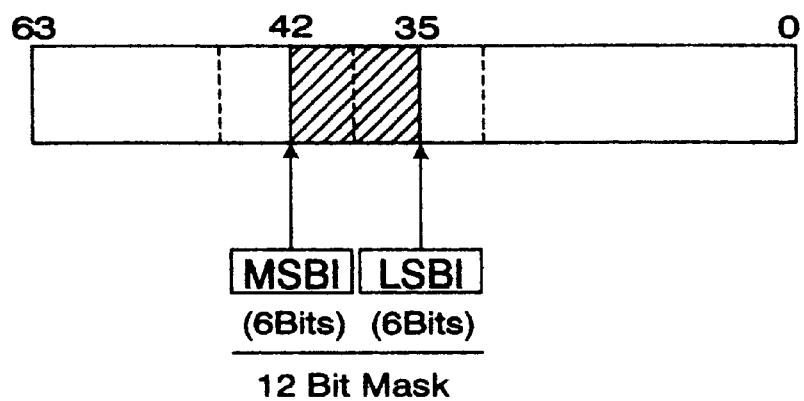

FIG. 9 illustrates the merge operation corresponding to the argument D1" of FIG. 7c. As illustrated, in FIG. 9a, the resultant bit segment is unaligned with respect to standard byte segments contained in the argument D1' relating to FIG. 7c, wherein the bit field was also originally unaligned with a standard byte segment in D1. Initially, after the arithmetic operation is performed, a bit field indicator mask corresponding to the resultant bit segment from the full 64 bit word D1" is formed. The bit field indicator mask itself is comprised of two significant bit indicators, a least significant bit indicator comprised of 6 bits corresponding to the least significant bit of the bit field, and a most significant bit indicator comprised of 6 bits corresponding to the most significant bit of the bit field, creating a bit field indicator mask of 12 bits total, as illustrated in FIG. 9b.

Figure 9C:

In addition to the bit field indicator mask of FIG. 9b, another mask is created, a modified byte(s) mask comprised of a modified byte or bytes of aligned data, as in the current example two bytes of aligned data (16 bits) {47:40} and {39:32}, wherein the aligned data bytes are data bytes which have been partially modified by the overlap of bits contained in the resultant bit segment, as illustrated in FIG. 9c.

The packet processor's argument fetch unit does not convey 64 bits of 'mask' as would be natural in typical systems, rather, the packet processor's argument fetch unit passes on the two significant bit indicators related to the bit field (12 bits), along with the set of partially modified bytes (16 bits) or a single byte, which in turn reduces the amount of pipeline registers needed. When a final merge operation takes place, the two aligned byte portions (16 bits) or single byte portion, along with the indicator mask (12 bits) corresponding to the bit field, which reduces the number of bits carried in subsequent pipeline stages, are used to reconstruct a 64 bit merge mask, rather than carrying forward two typical 64 bit masks normally associated with typical applications of bit field manipulation. Further, the packet processor 110 updates the bit values of the resultant bit segment from the two individual bit indicators, along with the partially modified byte(s) value, into a resultant argument for use by the packet processor 110. Any of the modified bit values contained in the resultant argument of the final merge step are written back to register file.

While the invention has been described in terms of several embodiments, those skilled in the art will recognize that the invention is not limited to the embodiments described. The method and apparatus of the invention can be practiced with modification and alteration within the spirit and scope of the appended claims. The description is thus regarded as illustrative instead of limiting on the invention.

What is claimed is:

1. In a computer system, a method for direct manipulation of a bit field directly in memory, wherein a processor performs a bit field arithmetic operation with a first bit string and a second bit string, said method comprising:

shifting a bit segment contained in said first bit string toward a higher significant bit by a predetermined amount, said predetermined amount specified by a least significant bit within a bit field contained in said second bit string;

masking uninteresting bits contained in said first bit string not associated with said bit segment, masking uninteresting bits contained in said second bit string not associated with said bit field, providing for a first masked bit string and a second masked bit string, respectively; and performing said bit field arithmetic operation, wherein said masked bit strings are arithmetically coupled, providing for a resultant bit string containing a resultant bit field segment, said resultant bit field segment comprising an arithmetic operation result between said bit segment and said bit field.

2. The method for direct manipulation of a bit field directly in memory as defined in claim 1, wherein said bit field manipulation method utilizes a single computer instruction to accomplish said bit field arithmetic operation.

3. The method for direct manipulation of a bit field directly in memory as defined in claim 1, wherein said act of masking comprises:

inserting a logic state one (1) or a logic state zero (0) into said uninteresting bits of said second initial bit string depending upon said arithmetic operation to be performed and setting uninteresting bits of said first initial bit string to a logic state of zero (0).

4. The method for direct manipulation of a bit field directly in memory as defined in claim 3, further comprising:
carrying forward two individual bit indicators from said resultant bit string, a most significant bit indicator associated with a most significant bit of said resultant bit field segment and least significant bit indicator associated with a least significant bit of said resultant bit field segment, said most significant bit indicator and least significant bit indicator each individually comprising a 6 bit segment.

5. The method for direct manipulation of a bit field directly in memory as defined in claim 4, further comprising:
merging said two individual bit indicators into said resultant bit string to form a full final argument of a predetermined size.

6. The method for direct manipulation of a bit field directly in memory as defined in claim 6, further comprising:
updating bit values of said resultant bit field segment from said two individual bit indicators into said full final argument, wherein bits not associated with said resultant bit field remain unchanged from bit values contained in said second bit string.

7. The method for direct manipulation of a bit field directly in memory as defined in claim 6, further comprising:
writing said updated bits values of said resultant bit field segment to a register file.

8. The method for direct manipulation of a bit field directly in memory as defined in claim 4, wherein said bit field is unaligned, said unaligned bit field not conforming to a standard aligned byte size of data contained in said second bit string.

9. The method for direct manipulation of a bit field directly in memory as defined in claim 8, further comprising:
carrying forward any aligned byte(s) of data contained in said resultant bit string which are partially modified by said resultant bit field segment.

10. The method for direct manipulation of a bit field directly in memory as defined in claim 9, further comprising:
merging said two individual bit indicators and said modified byte(s) into said resultant bit string to form a full final argument of a predetermined size.

11. The method for direct manipulation of a bit field directly in memory as defined in claim 10, further comprising:
updating bit values of said resultant bit field segment from said two individual bit indicators into said full final argument, wherein bits not associated with said resultant bit field and said modified byte(s) remain unchanged from bit values contained in said second initial bit string.

12. The method for direct manipulation of a bit field directly in memory as defined in claim 11, further comprising:
updating modified bit values of said modified byte(s) of said full final argument from said resultant bit string values or said second initial bit string values.

13. The method for direct manipulation of a bit field directly in memory as defined in claim 12, further comprising:
writing said updated bits values of said resultant bit field segment and said modified byte(s) back to a register file.

14. In a computer system, a method for direct manipulation of a bit field directly in memory, wherein a processor performs a bit field arithmetic operation with a first bit string and a second bit string directly in memory, said method comprising:
rotating a bit field toward a higher significant bit by a predetermined amount in said first bit string providing for a first temporary bit string, said predetermined amount specified by a highest significant bit value of said first bit string minus an amount specified by a least significant bit contained in said bit field;
masking uninteresting bits contained in said first temporary bit string not associated with said bit field; and
performing said arithmetic operation, wherein said first temporary bit string is arithmetically coupled with said second bit string providing for a resultant bit string, said resultant bit string comprising an arithmetic result of said arithmetic operation result between said bit field and entire contents of said second bit string.

15. The method for direct manipulation of a bit field directly in memory as defined in claim 14, wherein said bit field manipulation method utilizes a single computer instruction to accomplish said bit field arithmetic operation.

16. The method for direct manipulation of a bit field directly in memory as defined in claim 14, wherein before performing said arithmetic operation, the method further comprises:
creating a second temporary bit string comprising an unaltered duplication of said second bit string; and
wherein performing said arithmetic operation comprises arithmetically coupling said first temporary bit string with said second temporary bit string providing for a resultant bit string, said resultant bit string comprising an arithmetic result of said arithmetic operation result between said bit field and entire contents of said second bit string.

17. The method for direct manipulation of a bit field directly in memory as defined in claim 16, wherein said act of masking uninteresting bits of said first temporary bit string comprises:
setting uninteresting bits of said first temporary bit string to a logic state of zero (0).

18. An apparatus for use in a computer system, said apparatus for performing bit field arithmetic operations directly in memory with bit fields contained in data strings, said apparatus comprising:
memory means, said memory means storing a plurality of said data strings of specified sizes, said data string comprised of aligned data segments;
logic circuitry for rotating a bit field of a first data string a predetermined distance from a first position to a second position creating a first temporary data string, said predetermined distance specified by a highest significant bit value of said first data string minus an amount specified by a least significant bit contained in said bit field;
instruction memory means for allowing said logic circuitry to fetch instructions every logic circuitry cycle; and
data transfer means for allowing said logic circuitry to access said memory means.

19. The apparatus for use in a computer system as defined in claim 18, wherein said logic circuitry utilizes a single computer instruction to accomplish said bit field arithmetic operation.

20. The apparatus for use in a computer system as defined in claim 18, wherein said logic circuitry fetches an instruction from said instruction memory means corresponding to said arithmetic operation to be executed.

21. The apparatus for use in a computer system as defined in claim 20, wherein said logic circuitry accesses said memory means via said data transfer means to perform said arithmetic operation on said first data string and a second data string contained in said memory means.

22. The apparatus for use in a computer system as defined in claim 21, wherein said logic circuitry masks all uninteresting bits contained in said first temporary data string not associated with said bit field, said uninteresting bits being set to logic state zero.

23. The apparatus for use in a computer system as defined in claim 22, wherein said logic circuitry generates a second temporary data string comprising an unaltered duplication of said second data string.

24. The apparatus for use in a computer system as defined in claim 23, wherein said logic circuitry performs said arithmetic operation, wherein said logic circuitry arithmetically couples said first temporary data string to said second temporary data string providing a resultant bit string, said resultant bit string comprising an arithmetic result of said arithmetic operation between said bit field in said first temporary data string and entire contents of said second temporary data string.

25. An apparatus for use in a computer system, said apparatus for performing bit field arithmetic operations directly in memory with bit fields contained in data strings, said apparatus comprising:

memory means for storing a plurality of said data strings of specified sizes, said data string comprised of aligned data segments;

logic circuitry for shifting a bit segment in a first data string a predetermined distance from a first position to a second position creating a first temporary data string, said predetermined distance specified by a least significant bit contained in a bit field of a second data string;

instruction memory means for allowing said logic circuitry to fetch instructions every logic circuitry cycle; and data transfer means for allowing said logic circuitry to access said memory means.

26. The apparatus for use in a computer system as defined in claim 25, wherein said logic circuitry masks all uninteresting bits contained in said first temporary data string not associated with said bit segment, said uninteresting bits being set to logic state zero.

27. The apparatus for use in a computer system as defined in claim 26, wherein said logic circuitry masks all uninteresting bits contained in said second data string not associated with said bit field providing a second temporary data string.

28. The apparatus for use in a computer system as defined in claim 27, wherein said logic circuitry inserts a logic state 1 (one) or a logic state 0 (zero) into individual bit locations of said all uninteresting bits contained in said second temporary data string not associated with said bit field, depending upon said arithmetic operation being performed.

29. The apparatus for use in a computer system as defined in claim 28, wherein said logic circuitry performs said arithmetic operation, wherein said logic circuitry arithmetically couples said first temporary data string with second temporary data string providing for a resultant data string, wherein said bit segment contained in said first temporary data string is arithmetically coupled with said bit field contained in said second temporary data string providing a bit field result contained in said resultant data string.

30. The apparatus for use in a computer system as defined in claim 29, wherein said logic circuitry carries forward from said resultant data string a least significant bit indicator specifying a least significant bit of said bit field result and a most significant bit indicator specifying a most significant bit of said bit field result, wherein each said bit indicator is individually comprised of 6 bits.

31. The apparatus for use in a computer system as defined in claim 30, wherein said logic circuitry carries forward any aligned byte(s) of data contained in said resultant bit string which are partially modified by said bit field result.

32. The apparatus for use in a computer system as defined in claim 31, wherein said logic circuitry merges said bit indicators and said partially modified byte(s) to formulate a full final argument of a specified predetermined size.

33. The apparatus for use in a computer system as defined in claim 32, wherein said logic circuitry updates bit values of said bit field result represented by said bit indicators into said full final argument.

34. The apparatus for use in a computer system as defined in claim 33, wherein said logic circuitry updates modified bit values of said modified byte(s) into said full final argument from either said bit string result or said second data string.

35. The apparatus for use in a computer system as defined in claim 34, wherein said logic circuitry writes said updated bits values of said resultant bit field and said modified byte(s) back to a register file.

36. A computer system, comprising:
a memory having a single instruction; and
a processor coupled to said memory, the processor, in response to the single instruction, to
shift a bit segment contained in a first bit string toward a higher significant bit by a predetermined amount, said predetermined amount specified by a least significant bit within a bit field contained in a second bit string,
mask uninteresting bits contained in said first bit string not associated with said bit segment,
mask uninteresting bits contained in said second bit string not associated with said bit field,
provide for a first masked bit string and a second masked bit string, respectively,
perform a bit field arithmetic operation, wherein said masked bit strings are arithmetically coupled, and
provide for a resultant bit string containing a resultant bit field segment, said resultant bit field segment comprising an arithmetic operation result between said bit segment and said bit field.

37. The computer system of claim 36 wherein said processor masks uninteresting bits contained in said first and second bit strings by inserting a logic state one (1) or a logic state zero (0) into said uninteresting bits of said second initial bit string depending upon said arithmetic operation to be performed and setting uninteresting bits of said first initial bit string to a logic state of zero (0).

38. The computer system of claim 36 wherein said processor, in response to the single instruction, retrieves the first and second bit strings from the memory, and writes the resultant bit string back to memory.

39. The computer system of claim 36 wherein said processor, in response to the single instruction, retrieves the first and second bit strings from the memory, and writes the resultant bit string back to memory.

40. A computer system, comprising:
a memory having a single instruction; and
a processor coupled to said memory, the processor, in response to the single instruction, to rotate a bit field in a first bit string toward a higher significant bit by a predetermined amount, said predetermined amount specified by a highest significant bit value of said first bit string minus an amount specified by a least significant bit contained in said bit field, mask uninteresting bits contained in said first temporary bit string not associated with said bit field, and perform a arithmetic operation, wherein said first temporary bit string is arithmetically coupled with a second bit string providing for a resultant bit string, said resultant bit string comprising an arithmetic result of said arithmetic operation result between said bit field and said second bit string.

41. The computer system of claim 40 wherein said processor masks uninteresting bits contained in said first bit string by setting uninteresting bits of said first temporary bit string to a logic state of zero (0).

* * * * *